C. B. Bennett.
Clothes-Drier.

№ 72782. Patented Dec. 31, 1867.

Witnesses
J. B. Mingle
George W. Mingle

Inventor:
Chas B Bennett

UNITED STATES PATENT OFFICE.

CHARLES B. BENNETT, OF AMBOY, ILLINOIS.

IMPROVED CLOTHES-DRIER.

Specification forming part of Letters Patent No. 72,782, dated December 31, 1867.

*To all whom it may concern:*

Be it known that I, CHARLES B. BENNETT, of Amboy, in the county of Lee and State of Illinois, have invented a new and useful Clothes and Fruit Drier or Rack, upon which to dry clothes or fruit; and I do hereby declare that the following is a full, clear, and exact description of the same, reference being had to the accompanying drawings, which form a part of this specification, in which—

Figure 1:
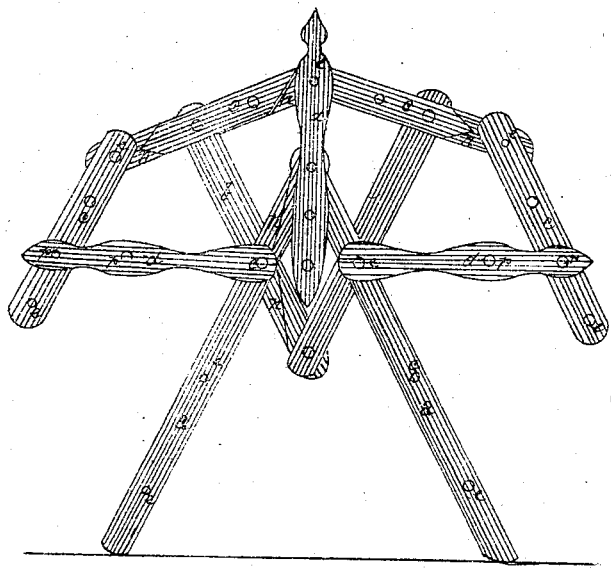
Figure 3:
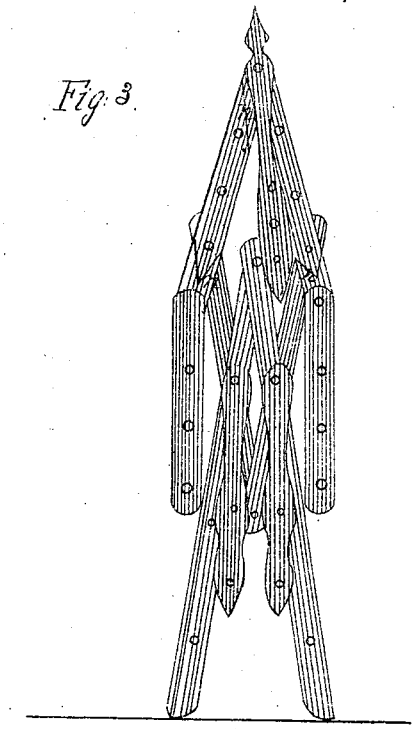
Figure 2:
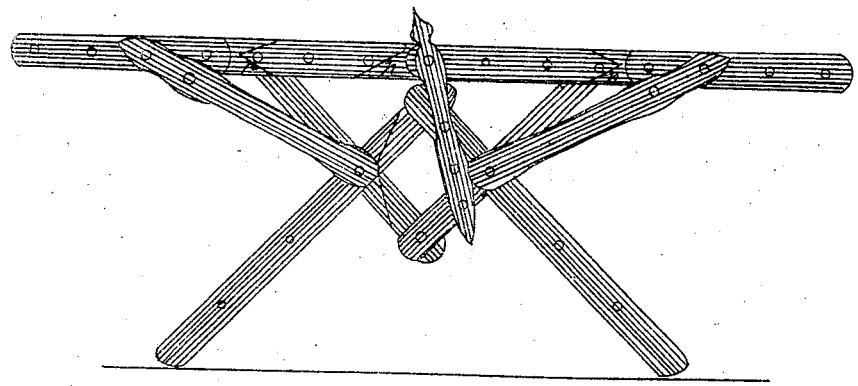
Figure 4:
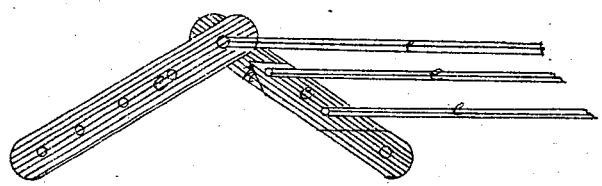

Figure 1 is a perspective view, in which it is used in the house for drying clothes. Fig. 2 represents it as used for drying fruit, being flat on top; and Fig. 3 shows its position when not in use, being closed; and Fig. 4 represents the manner in which the bars are hinged together.

To enable others skilled in the art to make and use my invention, I will proceed to describe its construction.

Fig. 1 shows one of the various positions in which it may be used for drying clothes. $a$ $a$ are the standards. $b$ $b$ are the shears, which connect the standards with the bars $c$ $c$ $c$ $c$. $d$ $d$ $d$ are the braces, which secure the rack in its various positions; and $e$ represents the rods upon which the clothes are to be hung, which may be made of any desirable length.

Fig. 2 represents it as a fruit-drier, it being placed out in the sun, and made flat on top, and a cloth or papers spread on it to hold the fruit; and it is held in this position by the braces $d$ $d$ $d$, which braces have a series of holes, $r$, in each, which adapt them to the various positions. The advantages of this rack for this purpose are obvious, as it can be easily moved from place to place to secure the most advantageous positions for sun and air, and can be taken into shelter in a moment's time in case of a sudden shower.

Fig. 3 shows it in a closed position, in which it may be used for drying small articles about a stove, and occupy but little space; and Fig. 4 represents the manner of connecting the bars $c$ $c$, in which it will be seen that they are halved together, with the shoulders beveled in a V shape, so as to allow the bars to fold together, and are connected by the ends of the rods $e$ passing through them, thus forming a hinge at each connection of the bars $c$, and also at the crossings of the standards $a$ and shears $b$. The shoulders $n$ on the standards $a$ and shears $b$ are beveled entirely on one side, instead of being beveled on both sides, as the bars $c$ are. The rods $e$ may be made round, or otherwise, and of any length to give the necessary width to the rack, and the bars $c$ may be made of any length to give room for any number of the rods $e$.

Thus it will be seen that I have a rack that is light, neat, cheap, durable, and useful for various purposes.

What I claim as new, and desire to secure by Letters Patent, is not the use of folding-bars and rods; but

I claim—

The combination of the standards $a$ with the shears $b$ and bars $c$, substantially as described and shown by the specification connected herewith.

CHARLES B. BENNETT.

Witnesses:
JERRY T. MARTIN,
GEORGE W. MINGLE.